United States Patent
Zegarski et al.

(12) 
(10) Patent No.: US 6,341,938 B1
(45) Date of Patent: Jan. 29, 2002

(54) METHODS AND APPARATUS FOR MINIMIZING THERMAL GRADIENTS WITHIN TURBINE SHROUDS

(75) Inventors: Frederick J. Zegarski, Cincinnati; John S. Carpenter, Warren, both of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/522,564

(22) Filed: Mar. 10, 2000

(51) Int. Cl.[7] ............................................... F01D 11/08
(52) U.S. Cl. .................................................... 415/173.4
(58) Field of Search ........................... 415/173.1, 173.3, 415/173.4, 174.2, 174.4, 220, 221, 227, 228

(56) References Cited

U.S. PATENT DOCUMENTS

| | | | | |
|---|---|---|---|---|
| 3,907,455 A | * | 9/1975 | Monsarrat | 415/220 X |
| 4,063,847 A | * | 12/1977 | Simmons | 415/200 |
| 4,371,311 A | * | 2/1983 | Walsh | 415/220 |
| 5,188,507 A | * | 2/1993 | Sweeney | 415/173.1 |
| 5,201,846 A | * | 4/1993 | Sweney | 415/173.6 |
| 5,749,701 A | * | 5/1998 | Clarke et al. | 415/173.7 X |
| 5,772,400 A | * | 6/1998 | Pellow | 415/173.1 |
| 6,120,242 A | * | 9/2000 | Bonnoitt et al. | 415/174.4 X |

* cited by examiner

Primary Examiner—John E. Ryznic
(74) Attorney, Agent, or Firm—Andrew C. Hess; Nathan D. Herkamp

(57) ABSTRACT

A low pressure turbine shroud includes a backplate and abradable material attached to said backplate. The backplate includes an upstream end, a downstream end, and a body extending between the upstream end and the downstream end. The body includes a first portion and a second portion. The body first portion has a first thickness greater than a body second portion second thickness. The abradable material attaches to an inner surface of the backplate and includes at least one segment having a thickness greater than remaining segments of abradable material.

20 Claims, 2 Drawing Sheets

METHODS AND APPARATUS FOR MINIMIZING THERMAL GRADIENTS WITHIN TURBINE SHROUDS

BACKGROUND OF THE INVENTION

This invention relates generally to gas turbine engines, and, more particularly, to gas turbine engines which include low pressure turbine shrouds.

A gas turbine engine typically includes a combustor assembly, a high pressure turbine, and a low pressure turbine. In known engines, the combustor assembly and the high and low pressure turbines are disposed within an engine casing. A plurality of static shrouds abut together to form a ring shroud circumferentially disposed around the low pressure turbine within the engine casing. Each static shroud includes a backplate and abradable material attached to the backplate. The abradable material has various thickness extending across the backplate. Areas of increased thickness provide a seal to prevent hot combustion gases from flowing between adjoining static shrouds and impinging upon the engine casing. Furthermore, the areas of increased thickness extend axially between adjoining low pressure stator and rotor assemblies and maintain axial clearances between such rotor and stator assemblies.

During operation, air and fuel are mixed and ignited within the combustor. As hot gases exit the combustor and flow into the low pressure turbine, the static shrouds surrounding the low pressure turbine shield the engine casing from the hot gases. Because the thickness of the abradable material varies across the downstream side of the backplate, a thermal response rate across the backplate varies relative to the thickness of the abradable material. As a result, thermal gradients develop across the backplate and between the backplate and the abradable material.

Such gradients are prevalent during accelerations of the engine from idle power operations to take-off power operations. Over time, such thermal gradients induce thermal stresses and may contribute to low cycle fatigue of the shroud. The thermal stresses may weaken the backplate material leading to an eventual failure of the backplate. Such backplate failures permit the hot gases exiting the combustor to impinge upon previously shielded rotor assemblies, stator assemblies, and engine casing.

BRIEF SUMMARY OF THE INVENTION

In an exemplary embodiment, a low pressure turbine shroud disposed within a gas turbine engine minimizes thermal gradients during engine operations. The shroud includes a backplate and abradable material attached to the backplate. The backplate includes an upstream end, a downstream end, and a body extending between the upstream and downstream ends. The body includes a first portion and a second portion. The first portion extends from the upstream end to the body second portion which extends to the downstream end. The body first portion has a first thickness and the body second portion has a second thickness. The abradable material attaches to an inner surface of the backplate and includes at least one segment having a thickness greater than the remaining segments of abradable material.

During engine operations, hot combustion gases enter the low pressure turbine and are shielded from an engine casing surrounding the low pressure turbine by the shroud. The areas of the backplate having an increased areas of thickness reduce a thermal response rate of the backplate such that the thermal response rate of the backplate body first portion is approximately equal that of a thermal response rate of the backplate body second portion. As a result, thermal gradients across the backplate are reduced.

DETAILED DESCRIPTION OF THE INVENTION

Figure 1:
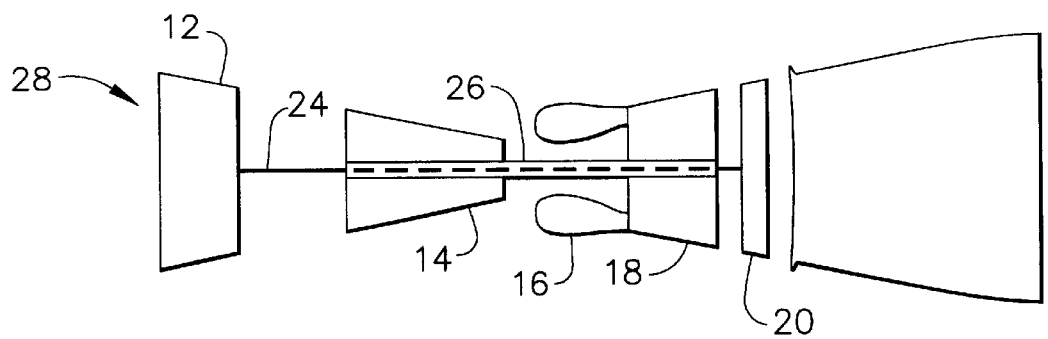
FIG. 1 is a schematic illustration of a gas turbine engine.

FIG. 1 is a schematic illustration of a gas turbine engine 10 including a low pressure compressor 12, a high pressure compressor 14, and a combustor assembly 16. Engine 10 also includes a high pressure turbine 18 and a low pressure turbine 20. Compressor 12 and low pressure turbine 20 are coupled by a first shaft 24, and compressor 14 and high pressure turbine 18 are coupled by a second shaft 26. In one embodiment, engine 10 is a GE90 engine available from General Electric Aircraft Engines, Cincinnati, Ohio.

In operation, air flows through low pressure compressor 12 from an inlet side 28 of engine 10 and compressed air is supplied from low pressure compressor 12 to high pressure compressor 14. Highly compressed air is then delivered to combustor assembly 16 where it is mixed with fuel and ignited. The combustion gases are channeled from combustor 16 and used to drive turbines 18 and 20.

Figure 2:
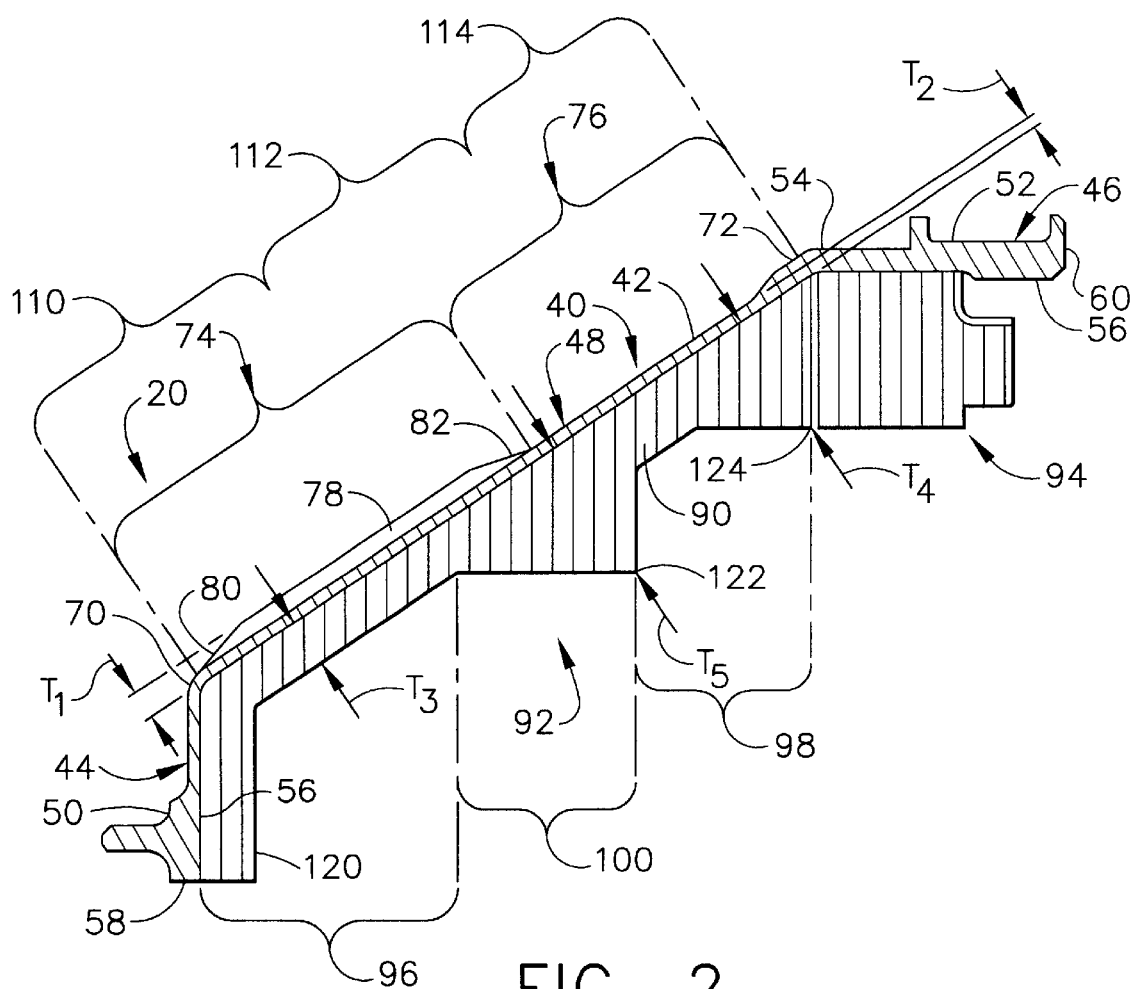
FIG. 2 is cross sectional view of a turbine shroud included in the gas turbine engine shown in FIG. 1.

FIG. 2 is a cross sectional view of a portion of low pressure turbine 20. Turbine 20 has an outer casing (not shown) circumferentially surrounding a stator assembly (not shown) and a rotor assembly (not shown). A plurality of shroud segments 40 are disposed radially inward from the outer casing. Shroud segments 40 circumferentially contact within the low pressure turbine outer casing to form a static ring shroud (not shown). Each shroud segment 40 includes a backplate 42.

Backplate 42 includes an upstream end 44, a downstream end 46, and a body 48 extending therebetween. Upstream end 44 extends radially inward from body 48 and forms a flange 50. Flange 50 is annular and permits backplate upstream end 44 to attach to a structural case (not shown). Downstream end 46 extends axially downstream from body 48 and forms a flange 52. Flange 52 is annular and permits downstream end 46 to attach to the structural case. Backplate 42 also includes an outer surface 54 and an inner surface 56. Outer and inner surfaces 54 and 56 extend over backplate 42 and connect at a radial inner edge 58 and a radial outer edge 60.

Backplate body 48 is conical in shape and extends substantially planar between upstream end 44 and downstream end 46. A first bend 70 extends between backplate upstream end 44 and backplate body 48 and a second bend 72 extends between backplate downstream end 46 and backplate body 48. Backplate body 48 includes a first portion 74 and a second portion 76. Body first portion 74 extends from bend 70 to body second portion 76 and body second portion 76 extends from body first portion 74 to second bend 72.

Backplate body first portion 74 has a thickness $T_1$ and backplate body second portion 76 has a thickness $T_2$ less than thickness $T_1$. Body first portion 74 tapers from first bend 70 and tapers towards body second portion 76. Body first portion thickness $T_1$ is greater than thickness $T_2$ because additional material 78 is attached to body outer surface 54. In one embodiment, additional material 78 is strips of material brazed to backplate body 48. Alternatively, additional material 78 is formed integrally with backplate 42. Additional material 78 has intrinsic material characteristics and properties substantially similar to those material characteristics and properties intrinsic with a material used in fabricating backplate 42. Specifically, additional material 78 has substantially similar properties of elastic modulus and mean thermal coefficient of expansion to those of the material used in fabricating backplate 42. Using the same material to fabricate backplate 42 and additional material 78 prevents problems that may be caused with bi-metallic strips of dissimilar metals. In one embodiment, backplate 42 is fabricated with MAR-M-509 cast alloy.

Body first portion additional material 78 includes a tapered leading edge 80 and a tapered trailing edge 82. Tapering leading and trailing edges 80 and 82 reduces stress concentrations that may be induced within backplate body 48 as a result of attaching additional material 78 to backplate body 48.

Abradable material 90 includes axial sections 92 and 94 attached to backplate inner surface 56 and extending downstream from backplate inner surface 56. Axial section 94 is attached to backplate inner surface 56. Axial section 92 includes a first portion 96, a second portion 98, and a third portion 100 extending between first portion 96 and second portion 98. Axial section first portion 96 is attached to backplate upstream end 44 and a segment 110 of backplate body 48. Axial section second portion 98 is attached to a segment 114 of backplate body 48. Axial section third portion 100 is attached to a segment 112 of backplate body 48 disposed between backplate body segments 110 and 114. Backplate body first portion 74 overlaps body segment 112.

Axial section first portion 96 has a minimum thickness $T_3$ extending between backplate inner surface 56 and an inner surface 120 of abradable material 90. Thickness $T_3$ is substantially uniform through axial section first portion 96. A thickness of axial section second portion 98 increases gradually from thickness $T_3$ to a thickness $T_4$ at an apex 124. Axial section third portion 100 has a thickness $T_5$ extending between backplate inner surface 56 and an apex 122 disposed within third portion 100. Third portion thickness $T_5$ is thicker than thickness $T_3$ and thickness $T_4$.

Third portion 100 is commonly called a land and is cylindrical in shape. Third portion 100 extends axially between low pressure turbine rotor and stator sections (not shown) and provides sealing to minimize hot gas flow between abradable material 90 and tips of associated rotors. Additionally, third portion 100 accommodates relative axial motion between the associated low pressure turbine stator and rotor sections, while maintaining clearances between the stator and rotor sections.

During operation, air enters engine 10 (shown in FIG. 1) and flows through compressors 12 and 14 (shown in FIG. 1). Air exiting high pressure compressor 14 enters combustor assembly 16 (shown in FIG. 1) and is mixed with fuel and ignited. Hot combustion gases flow through high pressure turbine 18 (shown in FIG. 1) and into low pressure turbine 20 (shown in FIG. 1). The static ring shroud shield prevents the hot combustion gases from impinging upon the outer engine outer casing. Additionally, abradable material 90 extends axially between the rotor and stator assemblies to form an interface that provide clearances between the assemblies and accommodates contact with the rotor assembly.

Heat from hot combustion gases impinges on backplate 42 and abradable material 90. Backplate additional material 78 reduces transient thermal stresses that may occur within backplate 42 without additional material 78. Backplate body thickness $T_1$ extends over abradable material segments 110 and 112, and thickness $T_2$ extends over a portion of abradable material segment 112 and 114. As hot combustion gases impinge backplate 42, thickness $T_1$ reduces a thermal response rate of backplate body first portion 74 such that a response rate of backplate body first portion 74 is approximately equal a thermal response rate of backplate body second portion 76. As a result, transient gradients across backplate 42 are reduced, thus reducing potential thermal gradients during engine operations.

Figure 3:
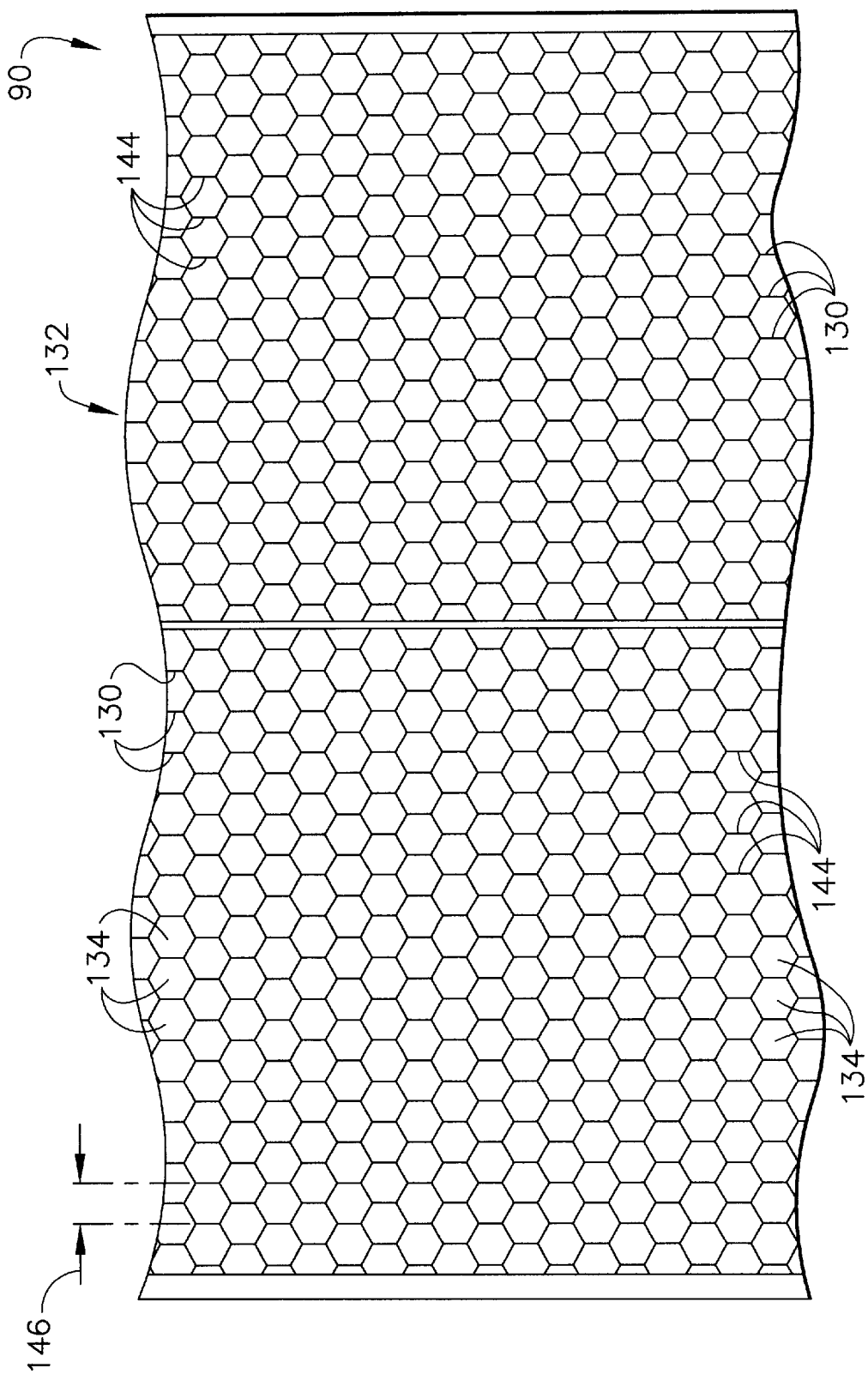
FIG. 3 is an enlarged end view of abradable material connected to the turbine shroud shown in FIG. 2.

FIG. 3 is an enlarged end view of abradable material 90. Abradable material 90 is formed of a plurality of thin corrugated strips 130 mated together in a honeycomb configuration 132. Honeycomb configuration 132 includes a plurality of cells 134 and a plurality of cell walls 144 separating each cell 134. In one embodiment, cells 134 have a hexagon shape. Alternatively, cells 134 could have a circular, triangular, rectangular, pentagon, or other shape. Each cell 134 has a width 146 greater than 0.0625 inches measured across each cell 134 between diametrically opposed cell walls 144. In one embodiment, width 146 is within a range of approximately 0.1 inches to approximately 0.15 inches. In an alternative embodiment, width 146 is approximately 0.125 inches. Cell width 146 reduces a solidity of abradable material 90. As a result, during engine operation, cells 134 reduce a rub severity of the low pressure rotors (not shown) and further improve backplate 42 thermal response rates within an axial length of abradable material 90. As a result, thermal gradients in backplate 42 are further reduced.

The above described backplate is cost-effective and highly reliable. The backplate includes a conical body including a first portion and a second portion. The body first portion includes additional material attached such that the first portion has a thickness greater than a thickness of the second portion. Additionally, abradable material extends from an inner surface of the backplate. The abradable material includes at least one segment having a thickness greater than a thickness of other segments of abradable material. During operations, the backplate increased thickness reduces the thermal response rate of the backplate body first portion such that a thermal response rate of the backplate body first portion is approximately equal a thermal response rate of the backplate body second portion. Additionally, the increased abradable material cell size permits the backplate to operate with increased metal temperatures in comparison to backplates including abradable material having smaller cells. Backplate temperatures at locations having thinner abradable material thickness' increase less significantly in comparison to those areas of thicker abradable material because of the increased abradable material cell width. As a result, thermal gradients in backplate are reduced and a shroud is provided which permits a low pressure turbine to operate with a longer operating life.

While the invention has been described in terms of various specific embodiments, those skilled in the art will recognize that the invention can be practiced with modification within the spirit and scope of the claims.

What is claimed is:

1. A method for assembling a gas turbine engine including a low pressure turbine including a rotor and at least one shroud, the low pressure turbine disposed radially inward from the shroud, the shroud including a plurality of shroud segments, each of the shroud segments including a backplate and abradable material attached to the backplate, the backplate including an inner surface, an outer surface, an upstream end, a downstream end, and a body extending between the upstream end and the downstream end, the inner surface and the outer surface extending over the backplate, the backplate body having a first portion and a second portion, the first portion extending from the upstream end to the body second portion, the second portion extending from the body first portion to the backplate downstream end, said method comprising the steps of:

fabricating a plurality of backplates wherein each backplate body first portion has a first thickness and each backplate body second portion has a second thickness;

attaching abradable material to the inner surface of each backplate to form an interface with the rotor;

assembling the shroud segments to form an annular array disposed radially outward from the low pressure turbine rotor.

2. A method in accordance with claim 1 wherein said step of fabricating a plurality of backplates further comprises the step of fabricating the backplates such that the body first portion is thicker than the body second portion.

3. A method in accordance with claim 2 wherein said step of attaching the abradable material further comprises the step of attaching the abradable material such that the abradable material includes a first portion having a third thickness, a second portion having a fourth thickness, and a third portion extending therebetween and having a fifth thickness greater than the third thickness and fourth thickness.

4. A turbine in accordance with claim 3 wherein said step of attaching the abradable material further comprises the step of attaching the abradable material third portion to the backplate body inner surface.

5. A turbine in accordance with claim 4 wherein the abradable material includes a honeycomb material including a plurality of cells, each of the honeycomb cells having a width approximately 0.125 inches, said step of attaching the abradable material further comprising the step of attaching abradable material including a honeycomb configuration to the backplate.

6. A turbine shroud for a gas turbine engine, said turbine shroud comprising:

a backplate comprising an upstream end, a downstream end, and a body extending therebetween, said body comprising a first portion and a second portion, said first portion extending from said upstream end to said second portion, said second portion extending from said first portion to said downstream end, said first portion comprising a first thickness, said second portion comprising a second thickness, said backplate further comprising an outer surface and an inner surface, said outer and inner surfaces extending over said backplate; and abradable material attached to said backplate inner surface.

7. A turbine shroud in accordance with claim 6 wherein said body first thickness greater than said body second thickness.

8. A turbine shroud in accordance with claim 7 wherein said abradable material comprises a first portion, a second portion, and a third portion extending therebetween, said third portion having a third thickness, said second portion having a fourth thickness, said first portion having a fifth thickness, said third thickness greater than said fourth thickness and said fifth thickness.

9. A turbine shroud in accordance with claim 8 wherein said abradable material third portion is attached to said backplate body inner surface.

10. A turbine shroud in accordance with claim 9 wherein said abradable material third portion attaches to said backplate body first portion inner surface and to said backplate body second portion inner surface.

11. A turbine shroud in accordance with claim 10 wherein said backplate body is conical, said upstream end extending radially inward from said backplate body, said downstream end extending axially downstream from said backplate body.

12. A turbine shroud in accordance with claim 11 wherein said abradable material further comprises a honeycomb configuration comprising a plurality of cells.

13. A turbine shroud in accordance with claim 12 wherein each of said plurality of cells comprises a width greater than 0.0625 inches.

14. A turbine shroud in accordance with claim 13 wherein each of said cell widths is approximately 0.125 inches.

15. A gas turbine engine comprising a low pressure turbine comprising a turbine shroud disposed radially outward from said low pressure turbine, said shroud comprising a backplate and abradable material attached to said backplate, said backplate comprising an upstream end, a downstream end, and a body extending therebetween, said body comprising a first portion and a second portion, said first portion extending from said upstream end to said second portion, said second portion extending from said first portion to said downstream end, said first portion comprising a first thickness, said second portion comprising a second thickness, said backplate further comprising an outer surface and an inner surface, said outer and inner surfaces extending over said backplate.

16. A gas turbine engine in accordance with claim 15 wherein said backplate body first thickness greater than said backplate body second thickness.

17. A gas turbine engine in accordance with claim 16 wherein said low pressure turbine shroud abradable material comprises a first portion, a second portion, and a third portion extending therebetween, said third portion having a third thickness, said second portion having a fourth thickness, said first portion having a fifth thickness, said third thickness greater than said fourth thickness and said fifth thickness, said third portion attached to said backplate body inner surface.

18. A gas turbine engine in accordance with claim 17 wherein said abradable material further comprises a honeycomb configuration comprising a plurality of cells.

19. A gas turbine engine in accordance with claim 18 wherein each of said abradable material plurality of cells comprises a width greater than 0.0625 inches.

20. A gas turbine engine in accordance with claim 19 wherein said width of each of said abradable material plurality of cells is approximately 0.125 inches.

* * * * *